US006981416B2

(12) United States Patent
Chen et al.

(10) Patent No.: US 6,981,416 B2
(45) Date of Patent: Jan. 3, 2006

(54) MULTI-AXIS SOLID STATE ACCELEROMETER

(75) Inventors: Shyu-Mou Chen, Taoyuan (TW); Ming-Chun Huang, Taoyuan (TW); Chung-Ta Kau, Taoyuan (TW)

(73) Assignee: Chung-Shan Institute of Science and Technology, Taoyuan (CN)

( * ) Notice: Subject to any disclaimer, the term of this patent is extended or adjusted under 35 U.S.C. 154(b) by 0 days.

(21) Appl. No.: 10/717,617

(22) Filed: Nov. 21, 2003

(65) Prior Publication Data

US 2005/0109108 A1    May 26, 2005

(51) Int. Cl.
 *G01P 15/125*    (2006.01)
(52) U.S. Cl. .................................... 73/510; 73/514.32
(58) Field of Classification Search ............ 73/514.32, 73/514, 16, 29, 36, 510, 514.38
 See application file for complete search history.

(56) References Cited

U.S. PATENT DOCUMENTS 5,852,242 A * 12/1998 Devolk et al. ............ 73/514.17
6,041,653 A *  3/2000 Ichikawa et al. ......... 73/514.32
6,082,197 A *  7/2000 Mizuno et al. ........... 73/514.36
6,105,427 A *  8/2000 Stewart et al. ........... 73/514.32
6,131,457 A * 10/2000 Sato ......................... 73/514.31
6,230,564 B1 * 5/2001 Matsunaga et al. ...... 73/514.01
6,504,385 B2 *  1/2003 Hartwell et al. ............ 324/662

* cited by examiner

*Primary Examiner*—Helen Kwok
(74) *Attorney, Agent, or Firm*—Birch, Stewart, Kolasch & Birch, LLP (57) ABSTRACT

A multi-axis solid state accelerometer is made of electricity conductive material and is made by way of micro-machining. The main structure includes at least one proof mass connected to an anchor by several sensing beams and two boards are located on two sides of the main structure and fixed to the anchor. The sensing beams make the proof mass movable in parallel to or perpendicular to the boards. The surfaces of the proof mass include several grooves, which are parallel to the first axis and the second axis, and an area that has no grooves. Each board that face the grooves include two sets of electrodes and each of which includes several elongate electrodes located corresponding to the grooves. The two sets of elongate electrodes are located interposed each other. The board facing the area having no grooves has electrodes. The electrodes and the surfaces of the proof mass form detection capacitors for each axis. The component of the acceleration on each axis drives the proof mass to move along the respective axis and the capacitances of the corresponding capacitors are changed.

30 Claims, 6 Drawing Sheets

MULTI-AXIS SOLID STATE ACCELEROMETER

FIELD OF THE INVENTION

The present invention relates to an electrical capacity solid state accelerometer made by micro-machining techniques and more particularly, to an accelerometer for detection of acceleration in two or more axes.

BACKGROUND OF THE INVENTION

Figure 1A:
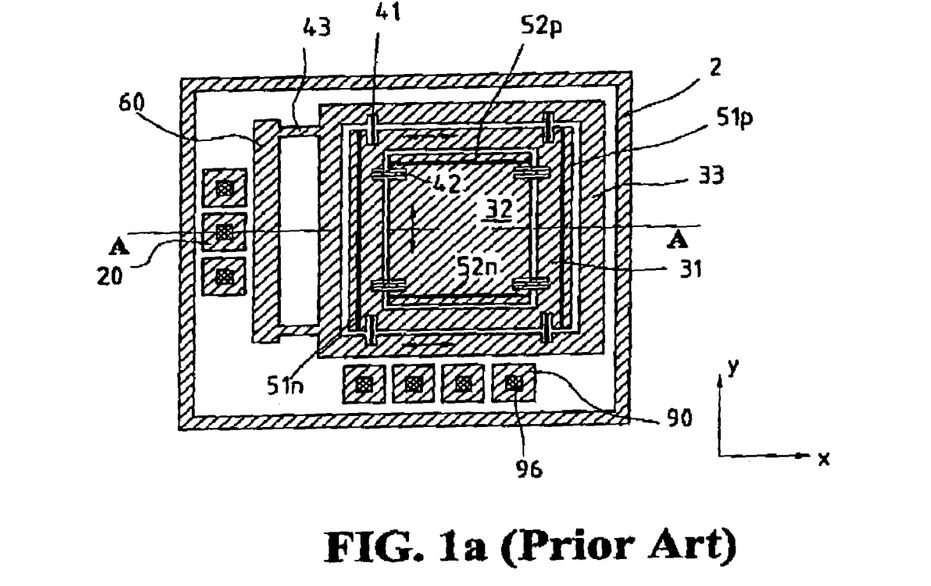
Figure 1B:
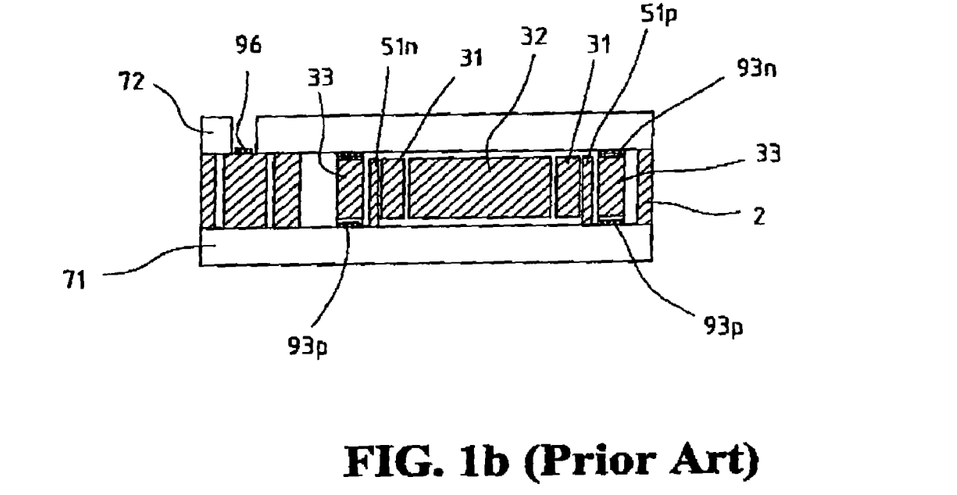

A conventional three-axis solid state accelerometer is shown in FIG. 1 of the attached drawings, comprising a proof mass 32, a plurality of sensing beams 42 connecting the proof mass 32 to a proof mass 31 surrounding the proof mass 32. The proof mass 32 is only moveable along y-axis. Electrodes 52p and 52n are located on opposite sides of the proof mass 32 and parallel to x-axis so as to form two y-axis sensing capacitors c92p and c92n. A plurality of sensing beams 41 connects the proof mass 31 to a proof mass 33 surrounding the proof mass 31 so that the proof mass 31 is only moveable along the x-axis. Electrodes 51p and 51n are located on two sides of the proof mass 31 and parallel to the y-axis so as to form two x-axis sensing capacitors c91p and c91n. Two sensing beams 43 connect the proof mass 33 to anchors 60 fixed to boards 71 and 72 so that the proof mass 33 is only moveable along z-axis. Electrodes 93p and 93n are located on the boards 71 and 72 and correspond to the two surfaces of the proof mass 33. The electrodes 93p and 93n form two z-axis sensing capacitors c93p and c93n on two sides of the proof mass 33.

When acceleration occurs in the y-axis, the y-axis sensing capacitors c92p and c92n detect the acceleration due to the change of their capacitances resulting from change of spaces.

When acceleration occurs in the x-axis, the x-axis sensing capacitors c91p and c91n detect the acceleration due to the change of their capacitances resulting from change of spaces.

When acceleration occurs in the z-axis, the z-axis sensing capacitors c93p and c93n detect the acceleration due to the change of their capacitances resulting from change of spaces.

Two deep and narrow spacing parallel surfaces have to be formed when making the x-axis and y-axis capacitors of a conventional accelerometer. The process for making the two deep and narrow spacing surfaces employs surface micro-machining or dry etching, and the aspect ratio is reduced when the depth is increased. This limits the sensitivity of the accelerometer.

The present invention propose to change the structure of the sensing capacitors, when a component of acceleration parallel to the main surface moves the proof masses, the area of the capacitors is changed rather than changing the gap of the capacitors so that the two deep and narrow surfaces are needed. The requirement of the aspect ratio can be omitted so that the process is simplified.

SUMMARY OF THE INVENTION

In accordance with an aspect of the present invention, there is provided an capacitive type multi-axis solid-state accelerometer which involves easy manufacturing process, no high aspect ratio required, increasing the yield-rate and reducing the manufacturing cost.

Furthermore, the conventional accelerometer does not disclose the characteristics of the present invention.

The present invention will become more obvious from the following description when taken in connection with the accompanying drawings, which show, for purposes of illustration only, preferred embodiments in accordance with the present invention.

BRIEF DESCRIPTION OF THE DRAWINGS

FIG. 1 shows a conventional accelerometer wherein the drawing (a) is a top view of the main structure and the drawing (b) shows a cross sectional view of the main structure;

FIG. 2 is a first embodiment of the three-axis accelerometer of the present invention, the drawing (a) shows the top view of the main structure, drawing (b) shows the stripe electrodes of the detection capacitor on the glass board, drawing (c) shows the cross-sectional view of the accelerometer;

FIG. 3 is a second embodiment of the three-axis accelerometer of the present invention, the drawing (a) shows the top view of the main structure, drawing (b) shows the stripe electrodes of the detection capacitor on the glass board, drawing (c) shows the cross-sectional view of the accelerometer;

DETAILED DESCRIPTION OF THE PREFERRED EMBODIMENTS

Figure 2A:
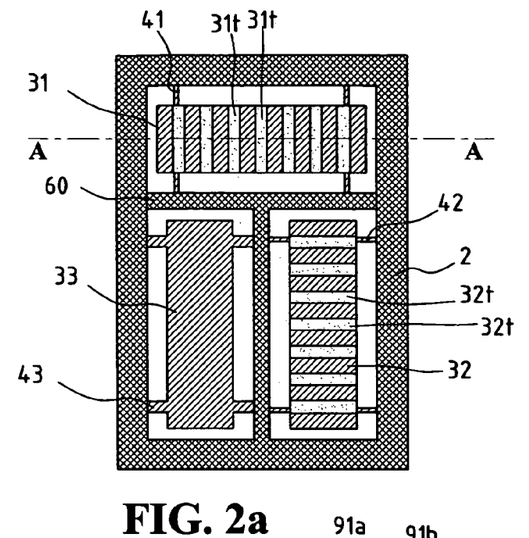

FIG. 2 shows a first embodiment of the three-axis accelerometer in accordance with the present invention wherein FIG. 2a shows a top view of the main structure and includes three proof masses 31, 32, 33 made of electricity conductive material. The three proof masses 31, 32, 33 are connected to a frame 2 or fixing anchors 60 by sensing beams 41, 42, 43. The frame 2 or the anchors 60 are fixed to boards 71, 72. The sensing beams 41, 42, 43 make the proof masses 31, 32, 33 movable only along a first axis, a second axis parallel the boards and z-axis which is perpendicular to the boards. The proof masses 31, 32 each have grooves 31t and 32t that are perpendicular to the first axis and the second axis.

Figure 2B:
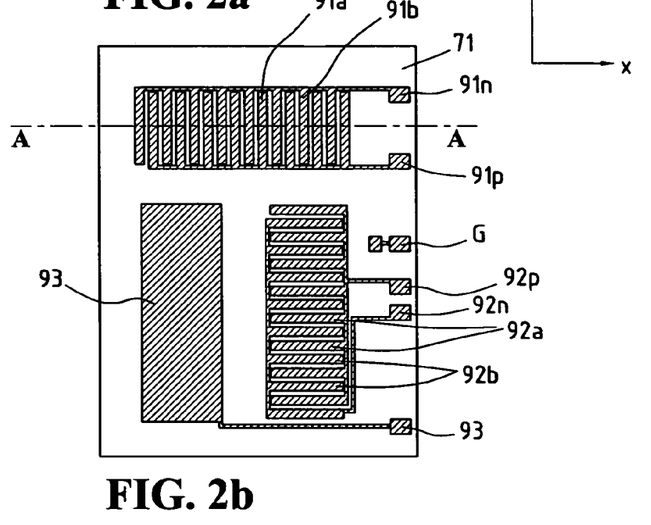
Figure 2C:
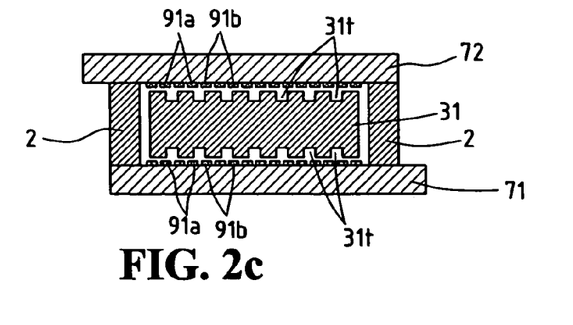

As shown in FIG. 2b, two sets of interposed stripe electrodes 91a and 91b parallel to the grooves 31t are located corresponding to the grooves 31t on the board 71, 72 and electrically connected to bond pads 91p and 91n, respectively, so as to form a first axis detection capacitors c91p and c91n with the surfaces of the block 31. FIG. 2c shows positional relationship between the electrodes 91a, 91b and the groove 31t on the first axis. When the acceleration along the first axis, the proof mass 31 causes a displacement on the first axis, the capacitances of the first axis sensing capacitors c91p and c91n change because of the change of the effective area. The changes of the two capacitances are opposite to each other so that the first axis acceleration can be detected by checking the difference of the capacitances of the two capacitors c91p and c91n. The detected signal can be fed back by a feedback circuit, which is not shown, to the first axis capacitors c91p and c91n, and the proof mass 31 remains still.

Two sets of interposed stripe electrodes 92a and 92b parallel to the grooves 32t are located corresponding to the groove 32t on the boards 71, 72 and are electrically connected to bond pads 92p and 92n, respectively, so as to form a second axis detection capacitors c92p and c92n with the surfaces of the block 32. When the acceleration along the second axis, the proof mass 32 generates a displacement on the second axis, the capacitances of the second-axis sensing capacitors c92p and c92n change because of the change of the effective area. The changes of the two capacitances are in opposite so that the second axis acceleration can be detected by checking the difference of the capacitances of the two capacitors c92p and c92n. The detected signal can be fed back by a feedback circuit, which is not shown, to the second axis capacitor c92p and c92n, and the proof mass 32 remains still.

Two electrodes 93 are located on the surfaces of the boards 71, 72 corresponding to the proof mass 33. The electrodes 93 form two z-axis detection capacitors c93p and c93n with the surfaces of the proof mass 33. When the acceleration along the z-axis, the proof mass 33 generates a displacement on the z-axis, the distance change of the boards of the z-axis capacitors c93p and c93n changes the capacitances of the capacitors. The changes of the two capacitances are in opposite so that the z-axis acceleration can be detected by checking the difference of the capacitances of the two capacitors c93p and c93n. The detected signal can be fed back by a feedback circuit, which is not shown, to the third axis capacitor c93p and c93n, and the proof mass 33 remains still.

The first embodiment includes three independent axes so that if only two axes are needed, the third axis is simply deleted.

Figure 3A:
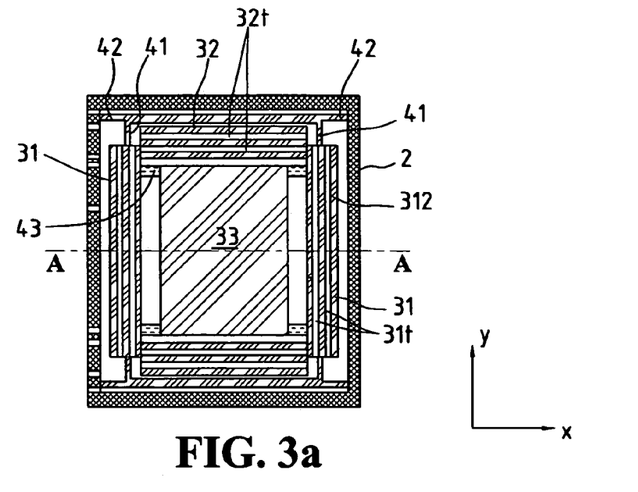

FIG. 3 shows a second embodiment of the three-axis accelerometer. FIG. 3a shows a top view of the main structure made of electricity conductive material and includes three proof masses 31, 32, 33. The two proof masses 31, 32 are connected with each other and located around the proof mass 33 so as to form a proof mass 312. The proof mass 33 is connected to the proof mass 312 by flexible sensing beams 43, and the proof mass 312 is connected to the sensing beam 42 by sensing beams 41. Two ends of the sensing beam 42 are connected to a frame 2 or anchors 60. The frame 2 or the anchors 60 are fixed to boards 71 and 72. The sensing beam 43 makes the proof mass 33 movable only along the z-axis perpendicular to the surface of the boards. The sensing beams 41, 42 make the proof mass 312 movable along the first axis and the second axis parallel to the boards. The proof masses 31, 32 include elongate grooves 31t and 32t perpendicular to the first axis and the second axis.

Figure 3B:
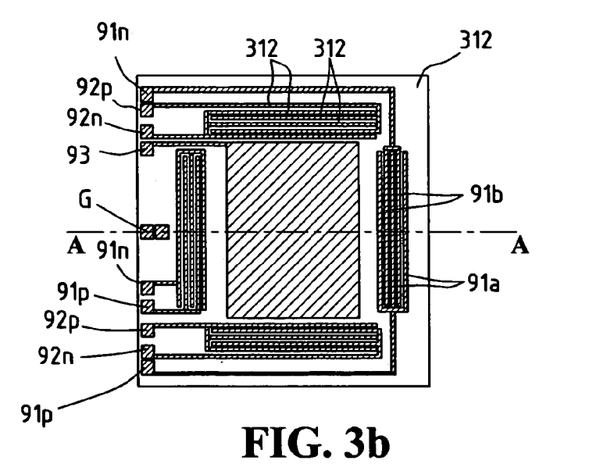
Figure 3C:
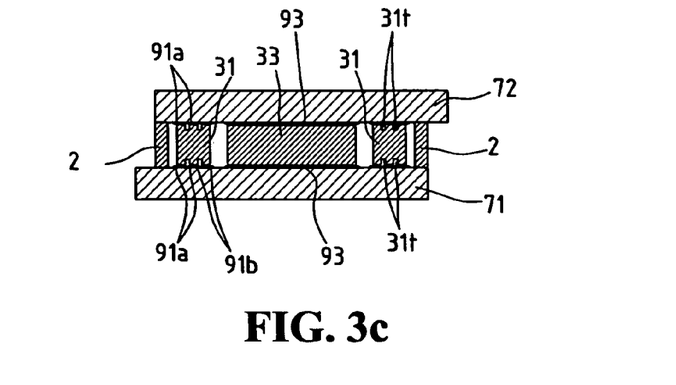

As shown in FIG. 3b, two sets of interposed stripe electrodes 91a and 91b parallel to the grooves 31t are located corresponding to the groove 31t on the board 71, 72 and electrically connected to the bond pads 91p and 91n respectively, so as to form a first axis detection capacitors c91p and c91n with the surface of the blocks 31. FIG. 3c shows positional relationship between the electrodes 91a, 91b and the grooves 31t. When the acceleration along the first axis applies to the proof masses 31, 32, 33, generating a displacement along the first axis, the capacitances of the first-axis capacitors c91p and c91n change because of the change of the effective area. The changes of the two capacitances are opposite so that the first axis acceleration can be detected by checking the difference of the capacitances of the two capacitors c91p and c91n. The detected signal can be fed back by a feedback circuit, which is not shown, to the first axis capacitor c91p and c91n, and the proof mass 31 remains still.

Two sets of interposed stripe electrodes 92a and 92b parallel to the grooves 32t are located corresponding to the grooves 32t in the boards 71, 72 and electrically connected to the bond pads 92p and 92n, respectively, so as to form a second axis detection capacitors c92p and c92n with the surface of the blocks 32. When the proof masses 31, 32, 33 are applied by the acceleration along the second axis, generating a displacement on the second axis, the capacitances of the second-axis capacitors c92p and c92n change because of the change of the effective area. The changes of the two capacitances are opposite so that the second axis acceleration can be detected by checking the difference of the capacitances of the two capacitors c92p and c92n. The detected signal can be fed back by a feedback circuit, which is not shown, to the second axis capacitor c92p and c92n, and the proof mass 32 remains still.

Two electrodes 93 are located on the surfaces of the boards 71, 72 and face the proof mass 33. The electrodes 93 form two z-axis detection capacitors c93p and c93n with the surfaces of the blocks 33. When the proof mass 33 is applied by the acceleration along the z-axis, the proof mass 33 generates a displacement along the z-axis and the distance change of the boards of the z-axis capacitors c93p and c93n changes the value of the capacitors. The changes of the two capacitances are opposite so that the z-axis acceleration can be detected by checking the difference of the capacitances of the two capacitors c93p and c93n. The detected signal can be fed back by a feedback circuit, which is not shown, to the third axis capacitor c93p and c93n, and the proof mass 33 remains still.

The acceleration along the first axis makes the proof masses 31, 32, 33 generate displacements along the first axis and the capacitances of the capacitors c92p and c92n on the second axis and the capacitors c93p and c93n on the z-axis is not affected if two ends of the electrodes 92a and 92b are not in flush with the two ends of the groove 32t, and the sides of the electrodes 93 are not in flush with the sides of the proof mass 33.

Similarly, the acceleration along the second axis makes the proof masses 31, 32, 33 generate displacements along the second axis and the capacitances of the capacitors c91p and c91n on the first axis and the capacitors c93p and c93n on the z-axis are not affected if two ends of the electrodes 91a and 91b are not in flush with the two ends of the groove 31t, and the sides of the electrodes 93 are not in flush with the sides of the proof mass 33.

The acceleration along the z-axis does not affect the proof masses 31, 32 so that the capacitances of the first axis capacitors c91p and c91n and the second axis capacitors c92p and c92n are not affected.

If only the first axis acceleration and the z-axis acceleration are required to be detected, simply remove the sensing beam 42 and connect the sensing beam 41 to the frame or the anchor 2, and delete the groove 32t that is perpendicular to the second axis, the electrodes 92a, 92b on the boards 71, 72, and the bond pads 92p ad 92n.

Figure 4:
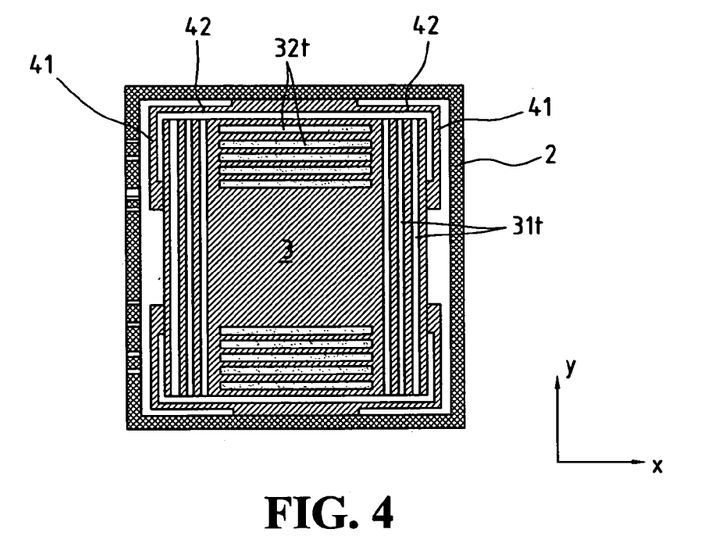
FIGS. 4 and 5 show two different types of a third embodiment of the three-axis accelerometer of the present invention.

The main structure of the third embodiment of the three-axis accelerometer is shown in FIG. 4, and includes a proof mass 3 that is connected to the sensing beam 42 by flexible sensing beams 41. The other end of the sensing beam 42 is connected to the frame 2 or the anchor 60. The frame 2 or the anchors 60 are fixed to the boards 71, 72. The sensing beams 41 and 42 form an L-shaped sensing beam so as to allow the proof mass 3 to be movable along the first axis, the second axis and movable along the z-axis. The proof mass 3 includes a plurality of grooves 31$t$, 32$t$ that are perpendicular to the first axis and the second axis, respectively, and an area that has no groove defined therein.

The electrodes on the boards 71 and 72 are similar to those described in the second embodiment, as shown in FIG. 3$b$. The principle of acceleration detection on each axis is the same as described above. The acceleration along the first axis does not affect the capacitors c92$p$, c92$n$ on the second axis and the capacitors c93$p$, c93$n$ on the z-axis, if the two ends of the electrodes 91$a$ and 91$b$, 92$a$ and 92 are not in flush with the two ends of the grooves 31$t$, 32$t$, and the electrode 93 is smaller than the area that has no groove of the proof mass 3. The acceleration along the second axis does not affect the capacitors c91$p$, c91$n$ on the first axis and the capacitors c93$p$, c93$n$ on the z-axis. The acceleration along the z-axis affects the capacitors c91$p$, c91$n$ on the first axis, the change of the capacitances of the capacitors c91$p$ and c91$n$ that on the same side of the main structure is happened simultaneously. As aforementioned, the detection of the acceleration along the first axis is obtained by checking the difference of capacitances of the capacitors c91$p$, c91$n$, so that the differences can be canceled. If a feed back circuit is employed, the acceleration along z-axis does not affect the capacitors c91$p$, c91$n$ on the first axis completely. Similarly, the acceleration along the z-axis also does not affect the capacitors c91$p$, c91$n$ on the second axis completely.

If only the acceleration on the first axis and z-axis are required to be detected, simply deleting the sensing beam 42 and connecting the sensing beam 41 to the frame 2 or the anchor 60. Canceling the grooves 32$t$ perpendicular to the second axis on the surfaces of the main structure, the electrodes 92$a$, 92$b$ on the surface of the boards 71, 72, and the bond pads 92$p$, 92$n$.

Figure 5:
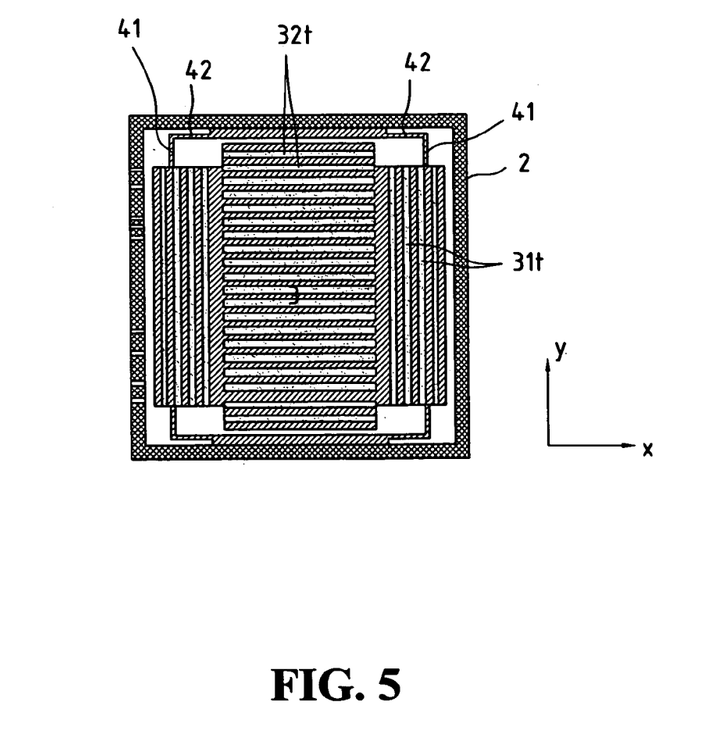

Another type of the third embodiment of the accelerometer is disclosed in FIG. 5, wherein the proof mass 3 has few grooves 31$t$, 32$t$ perpendicular to the first axis and the second axis on the two surfaces. On the boards 71, 72, include the electrodes of the first axis capacitors c91$p$, c91$n$ and the second axis capacitors c92$p$, c92$n$.

The detection of the accelerations of the x-axis and y-axis are the same as the preceding. The detection of the acceleration of the z-axis is dependent upon the output signals from the first axis capacitors c91$p$, c91$n$ and the second axis capacitors c92$p$, c92$n$. The z-axis detection capacitor c93$p$ is defined as the sum of c91$p$, c91$n$, c92$p$, and c92$n$ on the front side of the main structure, the z-axis detection capacitor c93$n$ is defined as the sum of c91$p$, c91$n$, c92$p$, and c92$n$ on the back side of the main structure. When the acceleration along the z-axis applies to the proof mass 3, which generates a displacement along the z-axis, the capacitances of the z-axis capacitors c93$p$ and c93$n$ changes because of the change of the gaps of the capacitors. The z-axis acceleration can be detected by checking the difference of the capacitances of the two capacitors c93$p$ and c93$n$. The detected signal can be fed back by a feedback circuit, which is not shown, to the z-axis capacitor c93$p$ and c93$n$, and the proof mass 3 remains still.

The acceleration along the first axis changes the capacitances of the first axis capacitors c91$p$, c91$n$ with same value but in opposite direction, so that the sum is not changed. Similarly, the acceleration along the second axis changes the capacitances of the second axis capacitors c92$p$, c92$n$ with same value but in opposite direction, so that the sum is not changed. Therefore, the acceleration on the first axis and the z-axis does not affect the z-axis capacitors c93$p$ and c93$n$.

The acceleration along the z-axis does not affect the detection on the first axis and the second axis, as aforementioned.

If only the acceleration of the z-axis and the first axis is needed to be detected, the sensing beams 41, 42 are needed to be designed again to allow the proof mass 3 to move along the first axis which is parallel to the board and the z-axis which is perpendicular to the board, and canceling the groove 32$t$ perpendicular to the second axis, the electrodes 91$a$, 92$b$ on the boards 71, 72 and the bond pads 92$p$ and 92$n$.

If only the acceleration of the first axis and the second axis is needed, the sensing beams 41, 42 are needed to be designed again to allow the proof mass 3 to move along the first axis and the second axis both of which are parallel to the board.

Figure 6:
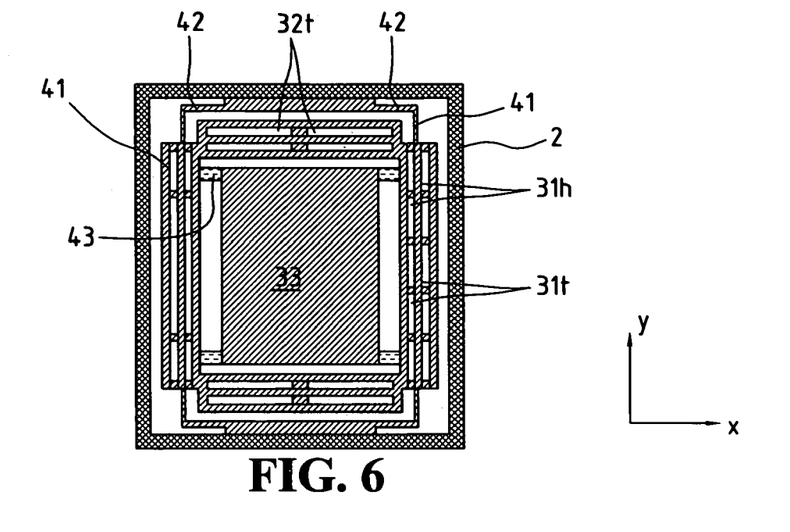
FIGS. 6 and 7 show different types of the second and the third embodiment of the three-axis accelerometer of the present invention.
Figure 7:
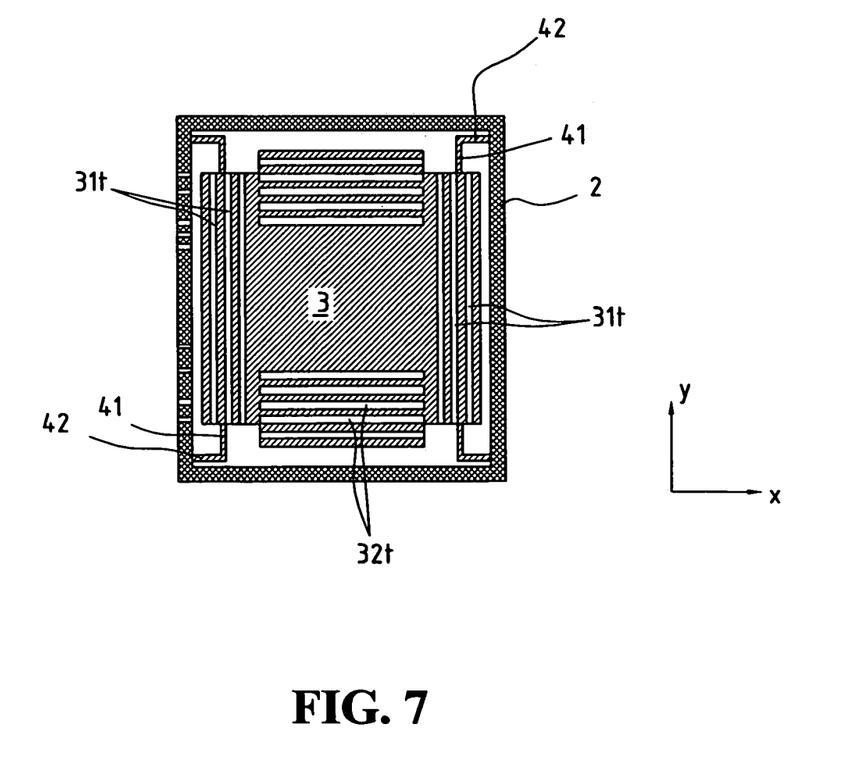

The grooves in the present invention may have different shapes such as a plurality of deeper recesses defined in the grooves, holes 31$h$, 32$h$ defined through the grooves, or the elongate grooves are replaced with slots as shown in FIG. 6.

The L-shaped sensing beams in the second embodiment and the third embodiment may have different embodiments such as the L-shaped sensing beams shown in FIGS. 4–7, and are connected to the frame and the proof mass by different ways.

The L-shaped sensing beam in the second embodiment can be exchanged with the other sensing beam, that is to say, the L-shaped sensing beam is located between two proof masses and the other sensing beam is connected to an outer proof mass and frame, or anchor such that the inner proof mass can only move in the first axis and the second axis parallel to the boards. The outer proof mass can only be movable along the z-axis, which is perpendicular to the board. The inner proof mass has a plurality of grooves 31$t$, 32$t$, which are perpendicular to the first axis and the second axis, and the two surfaces of the outer proof mass do not have grooves. The electrodes on the glass boards are changed accordingly.

The accelerometer can be made by surface micro-machining, dry etching, LIGA, bulk micro-machining. There is not necessary to make two deep and narrow spacing parallel surfaces and no high aspect ratio is required.

Figure 8A:
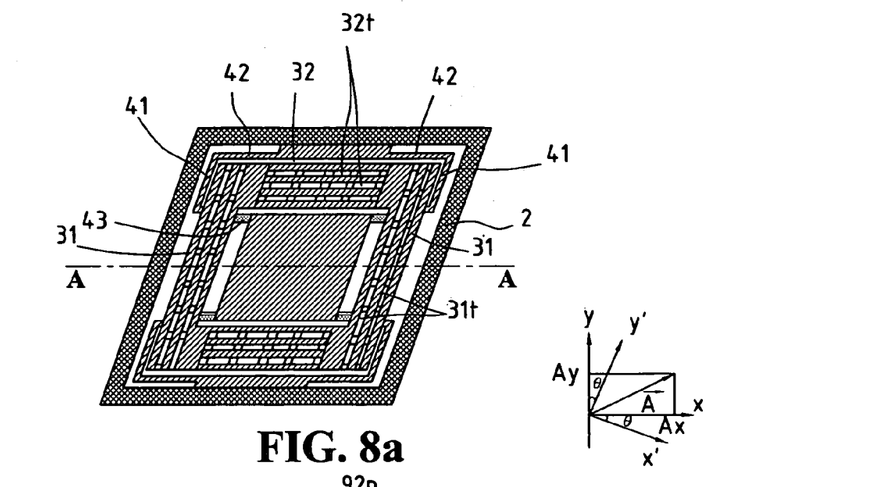
FIG. 8(a) shows a top view of the second embodiment of the three-axis accelerometer of the present invention that is made by micro-machining on a (110) silicon chip.
Figure 8B:
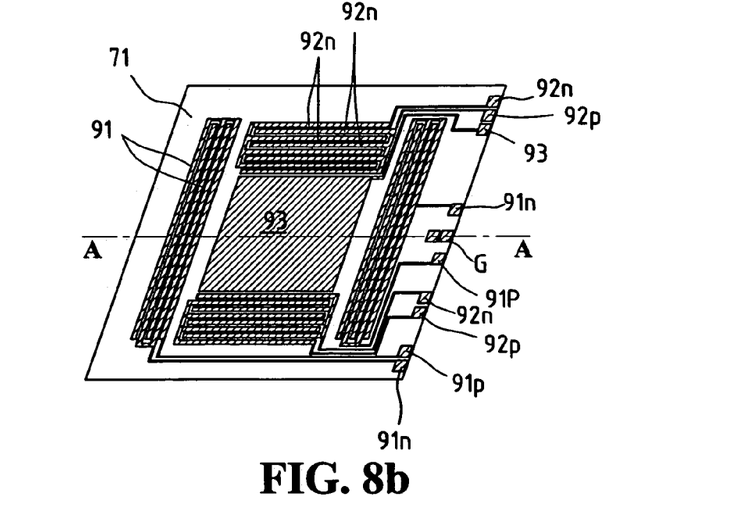
FIG. 8(b) shows the stripe electrodes of the detection capacitor on the board.
Figure 8C:
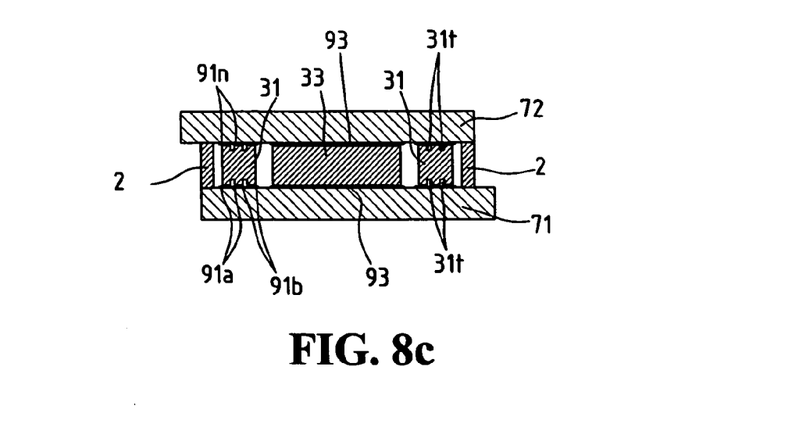
FIG. 8(c) shows the cross-sectional view of the accelerometer.

The embodiments mentioned above can be made on a (110) silicon chip by way of bulk micromachining, the device is in a parallelogram and the clamp angle between any two adjacent sides will be 109.48 or 70.52 degrees. For example, the second embodiment of the acceleration using (110) silicon chip by bulk micro-machining is shown in FIG. 8, which is the same as the illustration in FIG. 3 except the shape. The (110) silicon chip can be deeply vertical etched and automatically etching stop so that it is easily to manufacture the sensing beams and grooves, increasing the yield rate and the uniformity of the products. However, the sensing beams 41, 42 are non-orthogonal each other so that the first-axis and the second-axis output signals have to be transferred to an orthogonal coordinate system.

Defining a new coordinate system (x', y', z') formed by rotating an angle (19.48 degrees) from an original coordinate system (x, y, z). If the sensing beams 41, 42 are parallel to the y' axis and the x axis as shown in FIG. 8, then the first detection axis is parallel to the x' axis and the second detection axis is parallel to the y axis, so that the component of the detected accelerations are Ax' and Ay respectively. The (Ax', Ay) components has to be transferred to an orthogonal coordinate (x, y, z) or (x', y', z'): Assuming the coordinate of the system is (x, y, z), the two coordinates in FIG. 8 can be transferred from (Ax', Ay) to (Ax, Ay).

What is claimed is:

1. A multi-axis accelerometer comprising:
a main structure made of electricity conductive material and including a first proof mass and a second proof mass which are connected to a frame by sensing beams, the frame fixed between two boards, the first and the second proof masses movable only along a first axis and a second axis parallel to the boards, the first and the second proof masses each having grooves defined in each surface thereof and the grooves being perpendicular to the first axis and the second axis, respectively;
two sets of interposed stripe electrodes on each board and located in parallel with the grooves in the first proof mass, each set of the electrodes electrically connected to a bond pad, so as to form two first axis detection capacitors with a surface of the first proof mass, wherein when the acceleration has a component on the first axis, the capacitances of the first axis capacitors change and the change is transferred into a first axis acceleration signal via a circuit, and
two sets of interposed stripe electrodes on each board and located in parallel with the grooves in the second proof mass, each set of electrodes electrically connected to a bond pad, so as to form two second axis detection capacitors with a surface of the second proof mass, wherein when the acceleration has a component on the second proof mass, wherein when the acceleration has a component on the second axis, the capacitances of the second axis capacitors change and the change is transferred into a second axis acceleration signal via a circuit.

2. The multi-axis accelerometer as claimed in claim 1, wherein the main structure includes a third proof mass made of electricity conductive material and connected to the frame by a plurality of flexible sensing beams, the third proof mass movable only along a z-axis which is perpendicular to the surface of the two boards, and an electrode located on each board and facing the third proof mass so as to form two z-axis detection capacitors with the surfaces of the third proof mass, wherein when an acceleration has a z-axis component, the capacitances of the z-axis capacitors change and the change of the capacitances is transferred into a z-axis acceleration signal via a circuit.

3. A multi-axis accelerometer comprising:
a main structure made of electricity conductive material and including a first proof mass and a second proof mass which encloses the first proof mass, the first proof mass connected to the second proof mass by a plurality of first flexible sensing beams, the second proof mass connected to a frame by a plurality of second flexible sensing beams, the frame fixed between two boards;
the first flexible sending beams making the first proof mass movable only along a first axis and the second flexible sensing beams making the second proof mass movable only along a second axis, each surface of the first proof mass having elongate grooves defined therein which are perpendicular to the first axis; each surface of the second proof mass having elongate grooves defined therein which are perpendicular to the second axis;
two sets of interposed stripe electrodes on each board and located in parallel with the grooves in the first proof mass and the electrodes electrically connected to two bond pads so as to form two first axis detection capacitors with a surface of the first proof mass, wherein when the acceleration has a component on the first axis, the capacitances of the first axis capacitors change and the change is transferred into a first axis acceleration signal via a circuit, and
two sets of interposed stripe electrodes on each board and located in parallel with the grooves in the second proof mass and the electrodes electrically connected to two bond pads so as to form two second axis detection capacitors with a surface of the second proof mass, wherein when the acceleration has a component on the second axis, the capacitances of the second axis capacitors change and the change is transferred into a second axis acceleration signal via a circuit.

4. A multi-axis accelerometer comprising:
a main structure made of electricity conductive material and including a first proof mass and a second proof mass which encloses the first proof mass, the first proof mass connected to the second proof mass by a plurality of first flexible sensing beams, the second proof mass connected to a frame by a plurality of L-shaped sensing beams and the frame fixed between two boards;
the first flexible sensing beam making the first proof mass movably along a z-axis which is perpendicular to the boards, the L-shaped sensing beams making the second proof mass movable along a first axis and a second axis which are parallel to the boards, two surfaces of the second proof mass having elongate grooves defined therein part of which are perpendicular to the first axis and the other part of which are perpendicular to the second axis;
two sets of interposed stripe electrodes on each board and located in parallel with the grooves which perpendicular to the first axis in the second proof mass and the electrodes electrically connected to two bond pads so as to form two first axis detection capacitors with a surface of the second proof mass, wherein when the acceleration has a component along the first axis, the capacitances of the first axis capacitors change and the change is transferred into a first axis acceleration signal via a circuit;
two sets of interposed stripe electrodes on each board and in parallel with the grooves which perpendicular to the second axis in the second proof mass and the electrodes electrically connected to two bond pads so as to form two second axis detection capacitors with a surface of the second proof mass, wherein when the acceleration has a component on the second axis, the capacitances of the second axis capacitors change and the change is transferred into a second axis acceleration signal via a circuit; and
an electrode located on a surface of each boar and the surface facing the first proof mass so as to form two z-axis detection capacitors with the surfaces of the first proof mass, wherein when an acceleration having a z-axis component, capacitances of the z-axis capacitors change and the change is transferred into z-axis acceleration signal via a circuit.

5. A multi-axis accelerometer comprising a main structure made of electricity conductive material and including a proof mass which is connected to a frame by several a plurality of L-shaped sensing beams, the frame fixed between two boards, the L-shape sensing beams making the proof mass movable only along a first axis which is parallel to the boards and along a z-axis perpendicular to the two boards, wherein each surface of the proof mass include first area and a second area, the first area having grooves perpendicular to the first and the second area having no grooves;
  two sets of interposed stripe electrodes on each board and located in parallel with the grooves in the first area and the electrodes electrically connected to two bond pads so as to form two first axis detection capacitors with a surface of the proof mass, wherein when the acceleration has a component on the first axis, the capacitance of the first axis change and the change is transferred into a first axis acceleration signal via a circuit, and
  two electrodes on the two boards and located to face the second area, the electrodes electrically connected to two bond pads so as to form two z-axis detection capacitors with surfaces of the proof mass, wherein when the acceleration has a component on the z-axis, the capacitances of the z-axis capacitors change and the change is transferred into a z-axis acceleration signal via a circuit.

6. A multi-axis accelerometer comprising a main structure made of electricity conductive material and including a proof mass which is connected to a frame by several a plurality of L-shaped sensing beams, the frame fixed between two boards, the L-shaped sensing beams making the proof mass movable only along a first axis which is parallel to the boards and along a z-axis perpendicular to the two boards, wherein each surface of the proof mass have a plurality of grooves which are perpendicular to the first axis;
  two sets of interposed stripe electrodes on each board and located in parallel with the grooves in the proof mass and electrically connected to two bond pads so as to form two first axis detection capacitors with a surface of the proof mass, wherein when the acceleration has a component on the first axis, the capacitances of the first axis capacitors change and the change is transferred into a first axis acceleration signal via a circuit, and
  a sum of the first axis capacitors on one board and a sum of the first axis capacitors on the other board forming two z-axis capacitors, wherein when the acceleration has a component on the z-axis, the capacitances of the z-axis capacitors change and the change is transferred into a z-axis acceleration signal via a circuit.

7. A multi-axis accelerometer comprising:
  a main structure made of electricity conductive material and including a proof mass which is connected to a frame by a plurality of L-shaped flexible sensing beams, the frame fixed between two boards, the sensing beams making the proof mass movably along a first axis and a second axis parallel to the board, each surface of the proof mass including a first area and a second area, the first area having elongate grooves defined therein which are perpendicular to the first axis and a second area having elongate grooves defined therein which are perpendicular to the second axis;
  two sets of interposed stripe electrodes on each board and located in parallel with the grooves in the first area and the electrodes electrically connected to two bond pads so as to form two first axis detection capacitors with a surface of the proof mass, wherein when the acceleration has a component on the first axis, the capacitances of the first axis capacitors change and the change is transferred into a first axis acceleration signal via a circuit, and
  two sets of interposed stripe electrodes on each board and located in parallel with the grooves in the second area and the electrodes electrically connected to two bond pads so as to form two second axis detection capacitors with a surface of the proof mass, wherein when the acceleration has a component on the second axis, the capacitances of the second axis capacitors change and the change is transferred into a second axis acceleration signal via a circuit.

8. The multi-axis accelerometer as claimed in claim 7, wherein the L-shaped sensing beams make the proof mass movable along the first axis and the second axis parallel to the boards, and a z-axis perpendicular to the boards, each surface of the proof mass including three areas, a first area having elongate grooves perpendicular to the first axis, a second area having elongate grooves perpendicular to the second axis, a third area having no grooves;
  two sets of interposed stripe electrodes on each board and located in parallel with the grooves in the first area and the electrodes electrically connected to two bond pads so as to form two first axis detection capacitors with the surface of the proof mass, wherein when the acceleration has a component on the first axis, the capacitances of the first axis capacitors change and the change is transferred into a first axis acceleration signal via a circuit, and
  two sets of interposed stripe electrodes on each board and located in parallel with the grooves in the second area and the electrodes electrically connected to two bond pads so as to form two second axis detection capacitors with the surface of the proof mass, wherein when the acceleration has a component on the second axis, the capacitances of the second axis capacitors change and the change is transferred into a second axis acceleration signal via a circuit;
  an electrode located on each board and facing the third area, the electrodes forming two z-axis detection capacitors with surfaces of the proof mass, wherein when the acceleration has a component on the z-axis, the capacitances of the z-axis capacitors are changed and the change is transferred into a z-axis acceleration signal via a circuit.

9. The multi-axis accelerometer as claimed in claim 7, wherein the L-shaped sensing beams make the proof mass movable along the first axis and the second axis parallel to the boards, and a z-axis perpendicular to the boards, each surface of the proof mass including two areas, the first area having elongate grooves perpendicular to the first axis, a second area having elongate grooves perpendicular to the second axis;
  two sets of interposed stripe electrodes on each board and located in parallel with the grooves in the first area and the electrodes electrically connected to two bond pads so as to form two first axis detection capacitors with a surface of the proof mass, wherein when the acceleration has a component on the first axis, the capacitances of the first axis capacitors change and the change is transferred into a first axis acceleration signal via a circuit; and
  two sets of interposed stripe electrodes on each board and located in parallel with the grooves in the second area and the electrodes electrically connected to two bond pads so as to form two second axis detection capacitors with a surface of the proof mass, wherein when the acceleration has a component on the second axis, the capacitances of the second axis capacitors change and the change is transferred into a second axis acceleration signal via a circuit;
  a sum of the first axis capacitors and the second axis capacitors on one board and a sum of the first axis capacitors and the second axis capacitors on the other board forming two z-axis capacitors, wherein when the acceleration has a component on the z-axis, the capacitances of the z-axis capacitors change and the change is transferred into a z-axis acceleration signal via a circuit.

10. The multi-axis accelerometer as claimed in claim 1, wherein the acceleration signal of each axis is sent to the respective detection capacitors by feedback circuit so as to maintain the first proof mass and the second proof mass still.

11. The multi-axis accelerometer as claimed in claim 3, wherein the acceleration signal of each axis is sent to the respective detection capacitors by feedback circuit so as to maintain the first proof mass and the second proof mass still.

12. The multi-axis accelerometer as claimed in claim 4, wherein the acceleration signal of each axis is sent to the respective detection capacitors by feedback circuit so as to maintain the first proof mass and the second proof mass still.

13. The multi-axis accelerometer as claimed in claim 5, wherein the acceleration signal of each axis is sent to the respective detection capacitors by feedback circuit so as to maintain the proof mass still.

14. The multi-axis accelerometer as claimed in claim 7, wherein the acceleration signal of each axis is sent to the respective detection capacitors by feedback circuit so as to maintain the proof mass still.

15. The multi-axis accelerometer as claimed in claim 1, wherein the main structure is made by way of bulk micromachining on (110) silicon chips.

16. The multi-axis accelerometer as claimed in claim 3, wherein the main structure is made by way of bulk micromachining on (110) silicon chips.

17. The multi-axis accelerometer as claimed in claim 4, wherein the main structure is made by way of bulk micromachining on (110) silicon chips.

18. The multi-axis accelerometer as claimed in claim 5, wherein the main structure is made by way of bulk micromachining on (110) silicon chips.

19. The multi-axis accelerometer as claimed in claim 7, wherein the main structure is made by way of bulk micromachining on (110) silicon chips.

20. The multi-axis accelerometer as claimed in claim 1, wherein the first axis and the second axis are not orthogonal, the acceleration signals of the first axis and the second axis are transferred to an orthogonal coordinate.

21. The multi-axis accelerometer as claimed in claim 3, wherein the first axis and the second axis are not orthogonal, the acceleration signals of the first axis and the second axis are transferred to an orthogonal coordinate.

22. The multi-axis accelerometer as claimed in claim 4, wherein the first axis and the second axis are not orthogonal, the acceleration signal of the first axis and the second axis are transferred to an orthogonal coordinate.

23. The multi-axis accelerometer as claimed is claim 7, wherein the first and second axis are not orthogonal, the acceleration signal of the first axis and the second axis are transferred to an orthogonal coordinate.

24. The multi-axis accelerometer as claimed in claim 1, wherein the grooves in the main structure include a plurality of deep recesses or holes, or the grooves are replaced with slots.

25. The multi-axis accelerometer as claimed in claim 3, wherein the grooves in the main structure include a plurality of deep recesses or holes, or the grooves are replaced with slots.

26. The multi-axis accelerometer as claimed in claim 4, wherein the grooves in the main structure includes a plurality of deep recesses or holes, or the grooves are replaced with slots.

27. The multi-axis accelerometer as claimed in claim 5, wherein the grooves in the main structure include a plurality of deep recesses or holes, or the grooves are replaced with slots.

28. The multi-axis accelerometer as claimed in claim 7, wherein the grooves in the main structure include a plurality of deep recesses or holes, or the grooves are replaced with slots.

29. The multi-axis accelerometer as claimed in claim 6, wherein the acceleration signal of each axis is sent to the respective detection capacitors by feedback circuit so as to maintain the proof mass still.

30. The multi-axis accelerometer as claimed in claim 6, wherein the main structure is made by way of bulk micromachining on (110) silicon chips.

* * * * *